Jan. 5, 1937.   J. W. BRYCE   2,066,763
MATERIAL CONTROLLING SCALE
Filed June 9, 1934   3 Sheets-Sheet 1
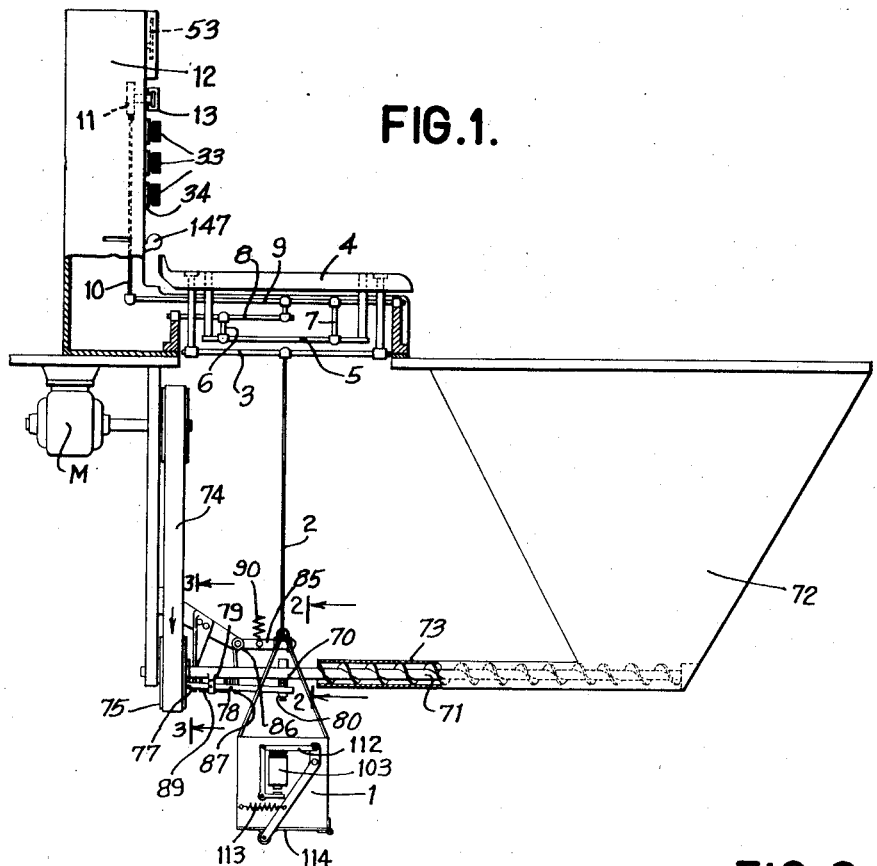
FIG. 1.
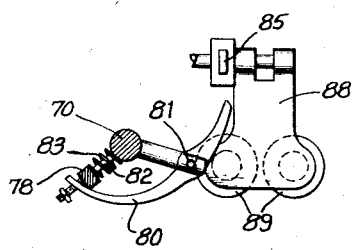
FIG. 2.
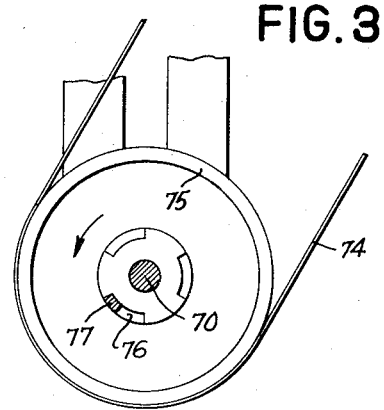
FIG. 3.
FIG. 4.
| 1 2 3 | 8 0 1 | R |
| 1 2 3 | 8 0 2 | |
| 1 2 3 | 8 0 3 | |
| 3 2 1 | 8 0 4 | |
| 3 2 1 | 8 0 5 | |
| 3 2 1 | 8 0 6 | |
| 3 2 1 | 8 0 7 | |
INVENTOR
James W. Bryce
BY
U. M. Wilson
ATTORNEY Jan. 5, 1937.  J. W. BRYCE  2,066,763
MATERIAL CONTROLLING SCALE
Filed June 9, 1934  3 Sheets-Sheet 2
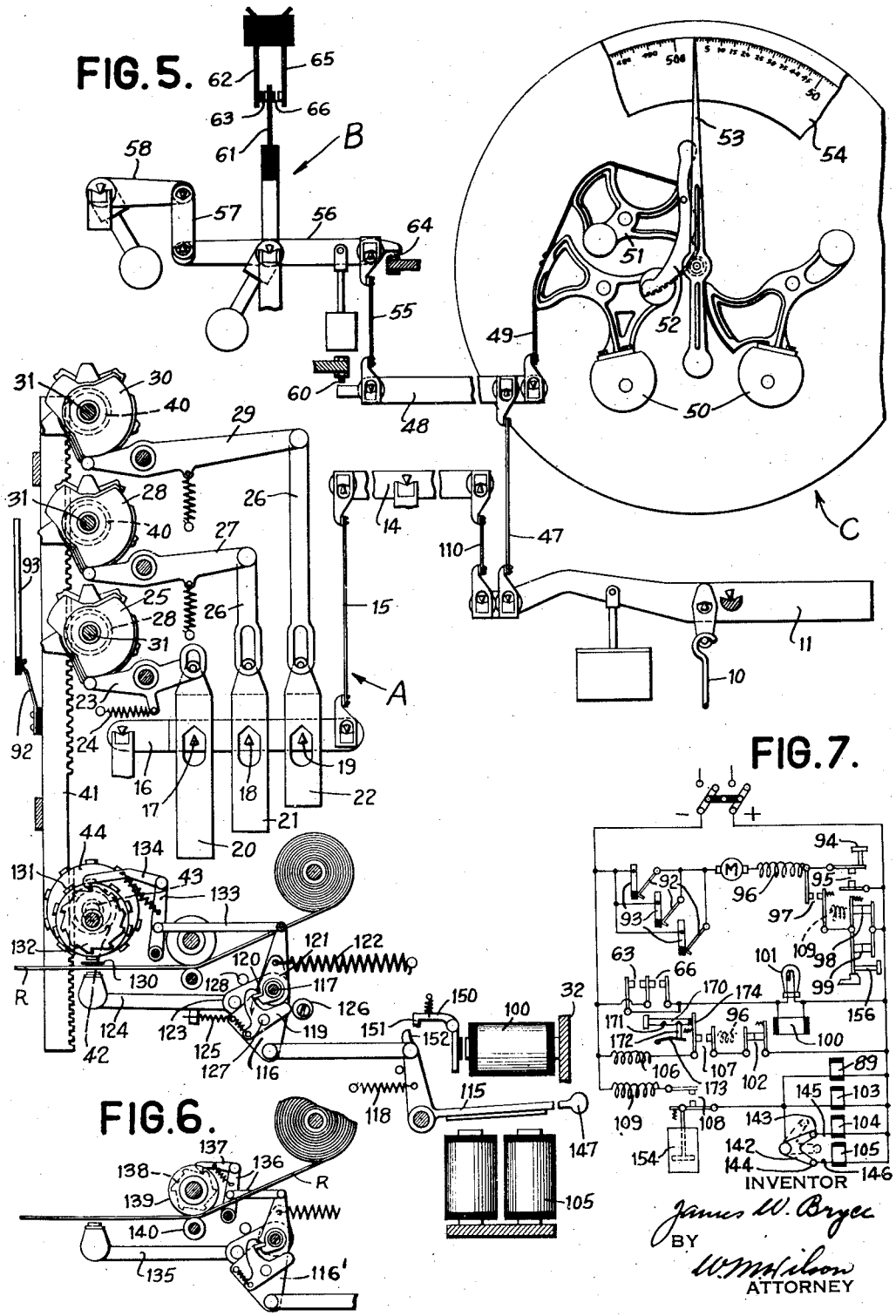

Jan. 5, 1937. J. W. BRYCE 2,066,763
MATERIAL CONTROLLING SCALE
Filed June 9, 1934 3 Sheets-Sheet 3
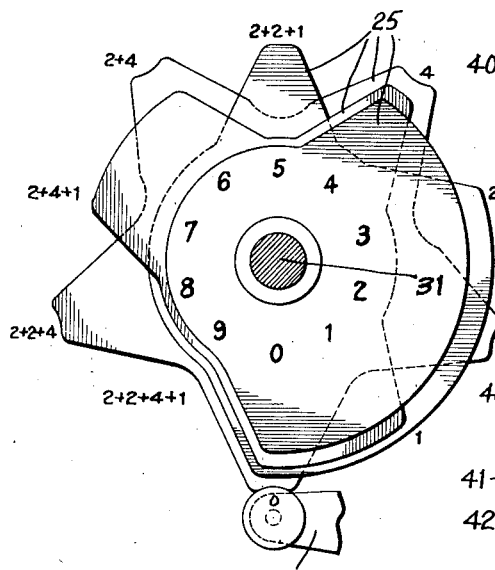
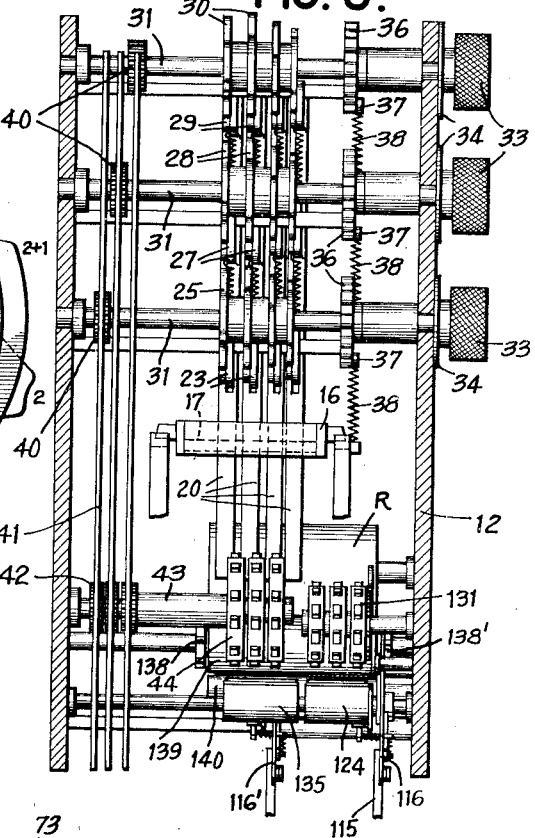
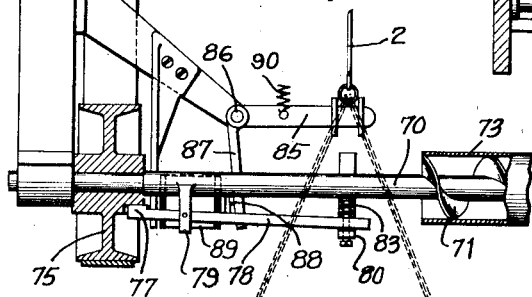
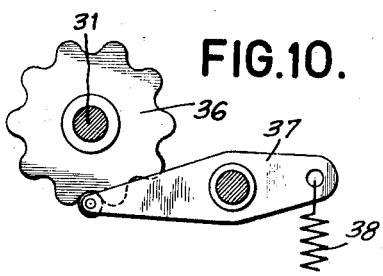
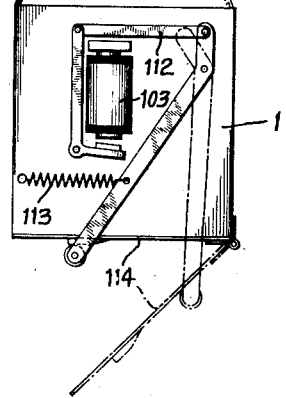
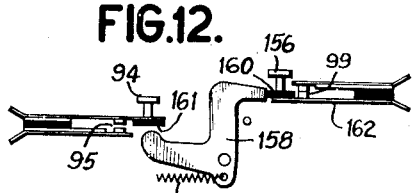
INVENTOR
James W. Bryce
BY
ATTORNEY Patented Jan. 5, 1937

2,066,763

UNITED STATES PATENT OFFICE 2,066,763

MATERIAL CONTROLLING SCALE

James W. Bryce, Bloomfield, N. J., assignor to International Business Machines Corporation, New York, N. Y., a corporation of New York Application June 9, 1934, Serial No. 729,794

16 Claims. (Cl. 249—63)

This case relates to automatic weighing mechanism for controlling delivery and discharge of predetermined weights of material.

One object is to provide under and over weight controls connected to the weighing mechanism for controlling the delivery or discharge of material measured out by the weighing mechanism.

Another object is to provide a sensitive weight or load responsive device as auxiliary to the weighing mechanism which measures out a predetermined weight of material for governing discharge or delivery of the material as measured out by the weighing mechanism.

Further, the latter object contemplates that the governing control by the sensitive load responsive device be electrically operated.

Still further, the sensitive load responsive device is intended to act only in response to a fraction of a minor order of the load applied to the weighing mechanism and to permit discharge or delivery of the material when the weight measured out is accurate to a limit within the same fraction of the load.

Still another object is to provide an automatically counterbalancing and indicating scale supplementary to the weighing mechanism which measures out the load for the purpose of indicating in weight units the reaction of said weighing mechanism to the load and to indicate whether the applied load is over or under weight.

The invention also contemplates recording of the delivered load, recording of the serial number of the load, alternative manual or automatic recording, automatic recording under control of aforesaid sensitive load responsive device, electric motor operation of the material handling means, novel start and stop means for the motor operation, and an intercontrol between the weighing mechanism and the material handling means which prevents operation of the latter prior to a preliminary and positive load setting of the weighing mechanism.

Other objects and advantages will be brought out in the following parts of the specification and understood from the drawings, wherein:

Fig. 1 is a partly sectional view of the complete apparatus,

Fig. 2 is a detail of the clutch release of the driving means for the material feed, Fig. 3 is a detail of the driving means for the material feed, Fig. 4 shows a part of the record slip with weight and serial number records of successive loads, Fig. 5 is a generally schematic showing of the combination of load responsive parts, Fig. 6 is a detail of the record slip feeding and weight printing means, Fig. 7 is a circuit diagram of the apparatus, Fig. 8 is a section through the settable weighing mechanism, Fig. 9 is a detail of cam controlling means for setting weights in said weighing mechanism, Fig. 10 is a detail of the detent for maintaining the weight setting against accidental movement, Fig. 11 is a partly sectional view of the material handling or feeding means including the material conveyor and the hopper to which the material is fed.

Fig. 12 is a detail of the stop and start keys of the actuating motor of the material feeding means.

The entire apparatus, for purposes of the explanation may be divided into four main parts or units; the settable weighing mechanism, generally denoted by A in Fig. 5; the sensitive load responsive device, generally indicated by B in Fig. 5; the automatic scale unit, generally denominated C in Fig. 5, and the material feeding means, generally denoted by D in Fig. 11.

The settable weighing and counterbalancing mechanism A is preliminarily set to counterbalance a predetermined load at balance position. The setting of mechanism A also positions recording wheels in said mechanism to record the predetermined load. The material feeding means D applies a load simultaneously to the settable weighing means A, the load responsive device B, and the automatic scale unit C. When the predetermined load is applied, mechanism A is at neutral position, B is likewise at neutral position, and scale C is at zero load position which indicates that the difference between the applied load and the load offset is zero. When B is in neutral position, it controls, through electrical circuits, the stopping of further conveying of material to the hopper, the discharge of the hopper contents, and the making of a record from said recording wheels.

Referring to Fig. 1, hopper 1 is pivotally suspended by draft rod 2 from a frame 3 removably attached to the bottom of platform 4. The platform is provided with sub-platform 5 which is suspended by links 6 and 7 from short and long levers 8 and 9, both of the third class. Long lever 9 is connected at its nose end to draft rod 10 which is hooked at its upper end to intermediate lever 11 (see Fig. 5).

Lever 11, as shown in Fig. 1, rigidly carries outside the casing 12 the usual tare bar and poise 13 (see my Patent 1,870,233), the poise being used in the present case to counteract the dead weight of the hopper and other parts, the weights of which are not to enter into the effective load. Lever 11 has one end connected by tape 110 to even balance lever 14 which through tape 15 transmits the force of the load to beam 16 of the settable weighing unit A. The beam 16 has three longitudinally spaced knife edges 17, 18 and 19, respectively carrying units order of four weights 20, tens order of four weights 21, and hundreds order of four weights 22. Units order weights are individually suspended from four levers 23 which are held by springs 24 in individual contact with four cams 25, tens weights 21 are individually suspended by links 26 from four levers 27 which are similarly engaged with four cams 28 and the hundreds order weights 22 are similarly suspended by links from levers 29 which follow cams 30.

Each set of cams is fast to its shaft 31, the shafts being in the same vertical plane, one above another, and journaled in frame 12. Each shaft carries a hand knob 33 outside the frame and an indicator plate 34 (see Fig. 8). The shafts also carry inside the frame toothed wheels 36 engaged by latch levers 37 which are held in impositive locking contact with the wheels by springs 38 (see Figs. 8 and 10) to prevent accidental rotation of the cams.

Each set of four weights in a denominational order includes one weight of value "1", two each of value "2", and one of value "4". When the high point of a cam is engaged with the lever of a weight, the weight is free of beam 16. When the low point of a cam engages the lever, the weight is free of the lever and applied to the beam.

The action of the cams and levers in each order is the same and for purposes of the explanation, assume that Fig. 9 shows the units order. At zero position the high points of all four cams 25 are engaging levers 23 and weights 20 are all free of the beam 16. When knob 33 is turned to position indicator 34 at "1", then the lever of the weight having a value "1" is in a depressed portion of its cam and the latter weight is now applied to the beam while the other three weight-carrying levers 23 are still engaged with high points of their cams. When the indicator 34 is at "2", then only a lever carrying a weight of value "2" is in a depression of its cam. At indicator position "3", weights "1" and "2" are deposited on beam 16, at "4" position, weight "4" alone is deposited, and so on in combinations indicated in Fig. 9 to provide values of "1" to "9" applied to the beam.

Each shaft 31 has a pinion 40 coacting with a vertical rack 41 which drives a pinion 42 on one of three nested shafts 43. Each of shafts 43 carries a type wheel 44 for printing "0" to "9". When a shaft 31 of any order is rotated to a position for depositing a certain value of weights on the beam 16, pinion 40 raises rack 41 to correspondingly rotate pinion 42 and the connected shaft 43 (see Figs. 5 and 8) to position the printing wheel 44 thereon for printing a number denoting the value of the weights deposited. Thus, if a "2" weight is deposited in the hundreds order, a "3" weight in the tens order, and a "9" weight in the units order, then the printing wheels 44 will be set to print 239.

Beam 11 transmits the force of the load in hopper 1 to the control unit B and automatic scale unit C by means of a tape 47 parallel to tape 110 and connected at its upper end to a factor lever 48. One end of the factor lever is connected to tape or ribbon 49 which rocks pendulums 50 and intermediate member 51 in proportion to the load. The member 51 carries rack segment 52 which rotates the pointer 53 to indicate the load in pounds on dial 54.

The other end of the factor lever 48 is connected by tape 55 to a pendulum lever 56 which through link 57 is connected to an oppositely rocking pendulum lever 58.

The length of factor lever 48 from tape 47 to tape 55 is, in the present case, nine times the length of the lever from tape 47 to tape 49. Therefore, the force transmitted by lever 48 to tape 55 is one-ninth the force transmitted by the lever to tape 49. The pendulum levers 56 and 58 have a maximum range to either side of a balance or neutral position proportional to a $\frac{3}{4}$ lb. load in the hopper. Therefore, the levers 56 and 58 may be made light and accurately and sensitively responsive to small fractions of loads less than a single pound. The automatic scale unit C has a capacity of 500 lbs., in the present case, and is graduated in pounds.

The suitability of unit B as a control unit, compared to unit C, may be brought out by the following analysis. Settable weighing mechanism A opposes the load in the hopper and tends to neutralize its effect on tape 47. Thus, the force of mechanism A is applied to intermediate lever 11 in opposition to the force of the load in hopper 1 ultimately applied through rod 10 to beam 11.

The difference between the opposed forces of unit A and of the hopper load on beam 11 may therefore be considered as the effective load transmitted to tape 47. The latter through factor lever 48 transmits one-ninth this effective load to unit B and eight-ninths to unit C. Therefore unit B may be made lighter and movable to greater extents under a small load than unit C. In other words unit B is a small capacity scale with a greater degree of responsiveness to a load, even to a fraction of a pound load, than scale B which is of far greater capacity and the movements of which under a small fraction of a pound may hardly be noticeable due to frictional and momentum factors.

Further, the factor lever 48 transmits the designated proportion of said effective load to unit B without interference by unit C; that is, the action of unit C has no effect on the action of unit B and therefore the latter does not partake of any errors or sluggishness in the action of unit C. To understand this, consider that so far as unit B is concerned, lever 48 may be considered as fulcrumed at the point of its connection to tape 49 of unit C and whether the tape has taken one position or another or is fixed, it still remains the same fulcrum point and anything which retards or influences the movement of this fulcrum point is of no effect on unit B. Therefore, unit B which is light, sensitive, and rapidly responsive to small changes of load is suitable for controlling the feeding of material to hopper 1 and the discharge of material therefrom, as well as other auxiliary operations, to within an accuracy of less than a pound.

The action of unit B under loads is as follows: When there is no load in the hopper and counterbalancing weights 20, 21, and 22 are free of beam 16, the pointer 53 of unit C stands at zero and pendulum levers 56 and 58 of unit B are at neutral or balance position. If now the weight 20 corresponding to 1 lb. is applied to beam 16, the latter will rock downwardly and through lever 14 and tape 110 pull up on beam 11 to reduce the force transmitted by tape 47 to factor lever 48. The force acting on pendulum levers 56 and 58 being reduced, the latter descend until the left end of lever 48 engages stop 60 (see Fig. 5). The lever 56 will have rocked counterclockwise and a contact blade 61 thereon will engage the under weight stationary contact blade 62 to close contact points 63.

Since the left end of lever 48 is engaged with stop 60 under influence of the 1 lb. weight on beam 16, additional weights applied to beam 16 will not further move the left end of the lever 48 and pendulums 56 and 58 will remain set in position without response to the additional movement of beam 16.

When the load in the hopper 1 is of the predetermined weight value, then the hopper load acting through beam 11 will pull down on tape 47 with the same force as the weights on beam 16 acting through beam 16, lever 14, and beam 11 pull up on the tape. Factor lever 48 will then return to initial, neutral, or zero position, and correspondingly, pendulum 56 and its contact blade 61 will move to neutral position and contact points 63 will open.

If the load in hopper 1 exceeds the predetermined value by more than ¾ lb., then the resultant force on tape 47 will be downward to depress lever 48 to such an extent as to rock pendulum 56 clockwise until it engages stop 64 (Fig. 5) after which further excess of load in the hopper will have no effect on unit B. When pendulum 56 is in contact with stop 64, blade 61 will engage over-weight contact blade 65 to close contact points 66.

Similarly, under weight in the hopper 1 will cause pointer 53 of automatic scale unit C to move back of the zero load position while overweight in the hopper will cause the pointer to move forwardly of the zero position. Whether the load in the hopper is too great or too little will be indicated by the pointer 53. If the load is in excess, the operator noting the action of pointer 53 may release enough of the material from the hopper to bring the pointer to zero and make adjustments to prevent the repetition of excess feed of material to the hopper.

Control unit B acts through under and overweight contacts 63 and 66, respectively, to control operation of the material feeding unit D to an accuracy or tolerance of ¾ pound from predetermined weight. It is understood that the tolerance may be varied by varying the sensitivity of unit B and may be proportional to the maximum weight of material which is to be measured out. Thus, if the predetermined load is not to exceed 10 lbs., then the weights 20, 21, and 22 may respectively represent one-hundredths of pound order, tenths of pound order, and pound order, automatic scale unit C may correspondingly have an automatic capacity of 10 lbs., and control unit B given a range of less than one-hundredth pound over or under and be correspondingly made light and sensitive enough to control the correct weight to a tolerance of less than a hundredth of pound.

The structure of the material feeding part D of the machine is an improvement on the means disclosed in Patent 993,069. Referring to Figs. 1, 2, 3, and 11, the horizontal shaft 70 rigidly carries at the right the screw conveyor 71 which conveys the material from the supply bin 72 through the duct 73 to the hopper 1 which is open at the top. The shaft 70 is releasably rotated by motor M (see Fig. 1) connected by belt 74 to pulley 75 which is freely rotatably mounted on the shaft. Pulley 75 is formed in the face directed towards the conveyor with three notches 76 any of which may receive the nose 77 of a clutch lever 78. The lever 78 is pivoted to a projection 79 rigid with the shaft 70 so that the shaft rotates with the clutch lever. When the predetermined load is in hopper 1, conveyor 71 must stop feeding material to the hopper and rotation of the shaft 70 must cease. Accordingly, clutch lever 78 must be released from pulley 75 as soon as the predetermined load is in hopper 1. Engaging the tail of the clutch lever is one end of a lever 80 extending at right angles to the shaft 70 to which it is pivotally connected at 81. A guide pin 82 fixed to shaft 70 passes loosely through appropriate openings in levers 78 and 80 and is surrounded by a coil spring 83 which urges the lever 78 in a direction to maintain clutch engagement with the pulley 75. Lever 80 rotates with shaft 70 and its upper or free end (as viewed in Fig. 2) normally passes freely below the horizontal arm 85 of bell crank lever 86, the other arm 87 of which is vertically disposed and provided with an armature plate 88 for coaction with double coil magnet 89. When the coils 89 are energized, they rock bell crank lever 86 clockwise, as viewed in Fig. 11, against the resistance of spring 90, thus lowering the free end of arm 85 into the path of rotation of the free end of lever 80.

The latter then strikes the arm 85 and is cammed along the side of the arm by continued rotation of shaft 70 to pivot relative to the shaft in a clockwise direction (as viewed in Fig. 2). This movement of lever 80 forces the tail of lever 78 inwardly against resistance of spring 83. The head 77 of lever 78 is thereby moved out of the notch 76 in flywheel 75 and shaft 70 and conveyor 71 cease rotating and feeding material to the hopper 1. When magnet 89 is deenergized, spring 90 lifts arm 85 free of lever 80 and spring 83 forces the lever 78 to rock clockwise (as viewed in Fig. 11) and shift shaft 70 to engage pulley 75 for again causing rotation of the conveyor 71 to feed material to hopper 1.

Energization of magnet 89 is controlled by the sensitive load responsive unit B and the manner in which this is done will be clear from the descriptions of the various circuits in connection with Fig. 7.

Before motor M can be set in operation, the drop weights 20, 21, and 22 must first be applied in desired combinations to the beam 16 of the settable weighing mechanism A. Each rack 41 (see Fig. 5) carries a leaf spring contact 92 which at zero position of the rack engages the lower insulated end of a stationary contact bar 93. When any denominational order of drop weights is set on beam 16, the associated rack 41 is raised, as previously explained, and conductively engages contact 92 with contact bar 93. The motor circuit can now be closed by the operator depressing start key 94 (Figs. 7 and 12) to close normally open contacts 95.

The circuit established will then be as follows: From the + side of the current supply line through contacts 95, magnet coil 96, motor M, and any one or more of the parallel contacts 92— 93 to the — side of the line. The motor M is now set in operation to rotate shaft 70 and material conveyor 71 in the manner previously explained.

When the operator releases the start key, contacts 95 open, but the motor circuit is held closed through paths which by-pass contacts 95. These paths are closed when magnet coil 96 is energized by the starting circuit. Energization of magnet 96 closes contacts 97 and the circuit to the motor is then made from the + side of the line through parallel pairs of normally closed contacts 98 and 99 and through contacts 97.

When a drop weight is applied to beam 16, it causes pendulum lever 56 of control unit B to swing counterclockwise and under-weight contacts 63 to close, and when the material in hopper 10 overbalances the lever 16, contacts 66 close, as described previously. Closing of contacts 63 or 66 completes a circuit through a locking magnet 100 as follows: From the + side of the line through magnet 100 (and lamp 101, in parallel therewith) and through either contacts 63 or 66 to the − side of the line. Lamp 101 lights to indicate to the operator that the scale is not in balance. Magnet 100, when energized opens normally closed contacts 102 to prevent operation of the clutch control magnet 89, the hopper dumping magnet 103 (see Figs. 7 and 11), the automatic weight printing magnet 104 and the serial number printing magnet 105, (see Figs. 5 and 7).

When the load in the hopper balances the opposing force of the drop weights within a tolerance governed by the sensitive load responsive control unit B (in the present case ¾ lb.) as hereinbefore explained, then contact arm 61 is in neutral position with both contacts 63 and 66 open. Consequently magnet 100 is deenergized and contacts 102 close. This forms a circuit through a magnet 106, as follows: from the + side of the line through contacts 102, contacts 107 closed by magnet coil 96 of the motor circuit, and through magnet 106 to the − side of the line.

Energization of magnet 106 closes contacts 108 to establish the following circuit: From the + side of the line, through the magnets 89, 103, 104, and 105, in parallel, through contacts 108, and through a magnet 109 to the − side of the line.

Energization of magnet 89 declutches the conveyor shaft 70 from the motor drive, as already described to stop feed of material into the hopper.

Energization of magnet 103 operates linkage 112 against resistance of spring 113 (see Fig. 11) to open the bottom 114 of the hopper and discharge its contents.

Energization of magnet 105 automatically effects serial number printing. Referring to Fig. 5, magnet 105 rocks armature 115 clockwise in opposition to spring 118 to in turn rock a plate 116 loose on shaft 117 counterclockwise. The latch 119 on the plate 116 engages a lug 120 on disk 121 fast to shaft 117 to rotate the latter likewise in counterclockwise direction and meanwhile stretch the spring 122 connected to the shaft 117.

An arm 123 fast to the shaft pivotally carries printing hammer 124 which is held in rear position relative to arm 123 by a spring 125. When, on counterclockwise movement of latch 119 about shaft 117, it strikes a stud 126, it is cammed in a counterclockwise direction about its own pivot 127 on the plate 116 to release lug 120 and permit spring 122 to return to normal and rock shaft 117 clockwise with hammer 124. The arm 123 during clockwise movement of the shaft 117 engages a stud 130 and stops but hammer 124 due to its momentum goes further, stretching spring 125, and strikes the record sheet R a snap blow to force it against the printing ribbon 10 and the serial number type wheels 131. The serial number of the load is thus printed at the right side of sheet R (see Fig. 4).

The serial number wheels 131 are advanced one step after each printing operation. To effect this, a ratchet wheel 132 (see Fig. 5) is secured to the unit order wheel 131. When the plate 116 is rocked counterclockwise by energization of magnet 105, through a connecting linkage 133 it rocks a pawl 134 counterclockwise to move the nose of the pawl past the next tooth of the ratchet wheel. After the printing operation, magnet 105 is deenergized and spring 118 rocks plate 116 clockwise, similarly causing pawl 134 to rock clockwise to rotate wheel 132 one step in the same direction. This advances the unit serial number printing wheel 131 one step. Any suitable transfer, such as a Geneva transfer, may be provided between the unit wheel and the higher order wheels.

Energization of magnet 104 causes the weight record to be printed from type wheels 44 at the left side of sheet R and in line with the serial number printing. The operation of the hammer 135 (Fig. 6) of the weight printing means is effected in the same way as in the serial printing means.

The line spacing of sheet R is effected by operation of ratchet wheels 138 and 138' (see Figs. 6 and 8). Ratchet wheel 138 is operated by means controlled by magnet 104 while wheel 138' is operated by duplicate means controlled by magnet 105. The ratchet wheels are of the same size and their teeth are spaced similarly so that when both magnets 104 and 105 are energized the sheet will be fed one predetermined amount without crimping. When only one magnet is energized, as will be later explained, then only one wheel 138 and 138' will be positively actuated and the sheet will be fed the predetermined amount. Since both operating means for wheels 138 and 138' are duplicates, only the means for operating wheel 138 under control of magnet 104 will be described.

Referring to Fig. 6, the counterclockwise movement of the plate 116' when magnet 104 is energized is transferred by linkage 136 to a pawl 137 which rides over one tooth of the ratchet wheel 138. Upon return of plate 116' after magnet 104 is deenergized, pawl 137 also returns and rocks ratchet wheel 138 clockwise. Friction wheel 139 fast to the ratchet wheel 138 is thus rotated and by coaction with friction roller 140 feeds the sheet R one line space.

There are occasions when automatic printing of the serial number and weight may not be desired. In that case, the magnets 104 and 105 are disconnected from the circuit by moving a member 142 (see Fig. 7) to the dotted line position to disconnect both terminals 143 and 144 from the circuit lines 145 and 146 leading from the magnets. If only automatic weight printing is to be cut out, then the member 142 is moved until terminal 143 is in circuit with line 146. If only automatic serial number printing is to be stopped, then the member 142 is moved until terminal 144 engages line 145.

When automatic printing is cut out, the operator may manually operate the printing mechanism. For this purpose, the armature lever 115 has a knob handle 147 at the free end which projects outside frame 12 of the settable weighing unit A and which may be grasped by the operator to be rocked clockwise.

To prevent manual printing operation before the control unit B is in neutral position which occurs when the predetermined load is in hopper 1, locking magnet 100 energized by closing of contacts 63 or 66, as previously described, attracts latch lever 150 to locate its nose 151 in the path of clockwise movement of the lug 152 at the upper end of the armature lever 115. Thus, the latter cannot be rocked clockwise until the magnet 100 is deenergized by the control unit B reaching neutral position.

To prevent too rapid deenergization of magnets 89, 103, 104, and 105, a dash pot 154 (Fig. 7) is connected to the lower contact 108 operated by magnet 106. The opening of contacts 108 is delayed by the resistance of dash pot 154 to return of the lower contact 108 upon deenergization of the magnet 106. This insures sufficient time for magnets 89, 103, 104, and 105 to properly effect their functions.

It should be noted that normally magnets 89, 103, 104, and 105 cannot be energized unless the motor is in operation. This intercontrol between the motor operation and the magnet operation is effected by placing contacts 107 in the circuit of magnet 106 as described, these contacts 107 are closed by magnet 96 in the motor circuit and therefore unless the latter circuit is made, the magnet 106 cannot be energized.

When it is desired to stop motor operation, the operator depresses stop key 156 (see Figs. 7 and 12) to open previously mentioned contacts 99 which are in one of the motor circuit paths described as by-passing the start key contacts 95.

Opening of contacts 99 is of itself ineffective to stop motor operation because the motor circuit is still made through the other by-pass contacts 98. Contacts 98 are controlled by magnet 109 which is in series in the circuit of magnets 89, 103, 104, and 105 and energized only when the predetermined load is in hopper 1 as detected by control unit B. When the magnet 109 is energized it opens contacts 98 and if stop key contacts 99 are also open, the motor circuit will be open through all paths and the motor will stop. By the above means, the stopping of the motor by the operator is not effected until the end of a weighing and printing cycle and therefore the hopper always discharges a full load.

Since the stop key 156 is depressed at any point of the cycle, it must be held down until magnet 109 is energized at the end of the cycle. For this reason, a latch lever 158 (Fig. 12) is provided the right hand end of which is moved by spring 159 over the insulating block 160 on the stop key when the latter is depressed. The stop key is thus held down until the operator presses start key 94. When the latter is depressed, the insulating block 161 at its lower end engages the left end of the latch lever 158 and rocks the latter counterclockwise to permit the lower spring blade 162 carrying one of stop key contacts 99 to move up and close contacts 99.

A brief summary of operations follows: The operator turns knobs 33 of unit A to set the drop weights 20, 21, and 22 on beam 16 according to the predetermined load to be fed to and discharged from hopper 1. As this is done, the contact arm 61 of unit B moves to the left and closes contacts 63 to energize magnet 100 and light signal lamp 101.

When indicator plates 34 adjacent knobs 33 indicate the desired setting, the operator depresses start key 94 to close contacts 95 and complete the circuit of motor M. Closing of the motor circuit starts the motor and energizes magnet 96. Magnet 96 closes contacts 97 to by-pass the start key contacts 95. The motor M rotates shaft 70 and conveyor 73 on the shaft to feed material into the hopper 1. As the load in the hopper increases, the beam 16 of unit A gradually rises and pointer 53 of automatic scale unit C moves towards 0 position, thereby indicating to an inspector or to the operator that the apparatus is operating properly. The gradual action of beam 16 and its taking positions proportional to the load in the hopper is rendered possible by the connection to the unit C the automatic counterbalancing means 50 of which is within the maximum range of the loads. Accordingly, beam 16 does not act in the same manner as an ordinary even balance beam scale which moves either to under or over position and the inertia of which must be overcome to bring it to neutral position. The force necessary to overcome the inertia results in overloading the usual beam and this error is avoided in the present construction by the gradual approach of the beam to balance position under control of unit C.

When the predetermined load is in hopper the contact arm 61 moved to neutral position, contacts 63 open, and magnet 100 is deenergized. Deenergization of magnet 100 permits contacts 102 to close and establish a circuit through relay coil 106.

Energization of the latter closes relay contacts 108 to close a circuit through magnets 89, 103, 104, 105, and 109. Magnet 89 causes clutch lever 78 to disconnect shaft 70 from the motor drive, thus stopping the feed. Energization of magnet 103 causes discharge of the hopper contents. Energization of magnets 104 and 105 effects weight and serial number printings on sheet R. Energization of magnet 109 opens contacts 98 in one of the start key by-pass circuits of the motor and if stop key contacts 99 are open breaks the motor circuit completely and stops the motor. As soon as the hopper is emptied, the beam 16 lowers and pendulum lever 56 moves counterclockwise to again cause contacts 63 to close. Magnet 100 is thereby energized to open contacts 102 and cause deenergization of magnets 89, 103, 104 and 105. This is the initial condition and clutch lever 78 again clutches the shaft 70 to the motor drive to feed material to hopper 1.

The unit C is adapted to weigh and indicate loads directly when the material feeding mechanism is not in operation. The settable weighing mechanism is then set to zero load offsetting position by removing all the counterweights from beam 16 by manipulation of knobs 33. An article placed on platform 4 then acts through beam 11, tape 47, lever 48, and tape 49 to swing pendulums 50 and pointer 53 according to the weight of the article and pointer 53 indicates the weight on dial 54.

Should it be desired to make a record of this weight, a key 170 (see Fig. 7) is pressed in until notch 171 therein is engaged by pin 172 urged by flat spring 173 into the notch. The key 170 is thereby impositively locked in position where its forward end engages blade 174 carrying one of relay contacts 107 to hold contacts 107 closed independently of relay magnet 96 in the motor circuit. Thus even though the latter is open, contacts 107 will be closed. Now after the load is placed on platform 4, knobs 33 are turned to set weights on beam 16 returning pointer 53 of unit C to zero position. When the pointer is within ¾ lb. under or over from the zero position, both pairs of contacts 63 and 66 of unit B will be open and therefore magnet 100 deenergized to permit contacts 102 to close. A circuit will then be closed from the + line, through contacts 102, contacts 107 (now closed by operation of key 170), and relay 106 to the — line. Energization of relay 106 closes contacts 108 which, as previously described closes a circuit through magnet 104 which automatically effects a printing of the weights from type wheels 44 set according to the setting of counterweights 20, 21, and 22.

When the material feeding means is to be set in operation, the key 170 is first retracted to permit contacts 107 to open until the motor circuit is established.

With respect to features of the scale mechanisms, per se, not herein claimed, there is to be no presumption of dedication as these features are embodied in my copending application, Serial No. 555,715, filed August 7, 1931.

While the invention has been disclosed in connection with the illustrated embodiment, it is considered that changes or variations may be made by those skilled in the art without departing from the invention. I therefore intend to be limited only by the objects of invention and by the claims.

I claim:

1. In combination, a main load responsive and counterbalancing mechanism, a load receiver for operating said mechanism, means for feeding material to the latter load receiver, an auxiliary counterbalancing mechanism separate from the main counterbalancing mechanism and comprising a sensitive weight responsive and variably resistant counteracting device controlled by the load on said receiver and displaced from its normal counterbalancing position by an initial portion of the counter-balance force of the mechanism for detecting whether said main counterbalancing mechanism is counterbalancing a predetermined load on the receiver, and means operable under control of the sensitive device upon its detecting that said predetermined load is counterbalanced by said main counterbalancing mechanism for cutting off the feed of material to said receiver.

2. In combination, load responsive and counterbalancing mechanism adjustably settable for counterbalancing different loads, means auxiliary to the counterbalancing mechanism and controlled for operation according to the setting of said mechanism, an actuator for said auxiliary means independent of the load force, and means for preventing operation of said actuator prior to setting of the counterbalancing mechanism away from its zero load counterbalancing position.

3. In combination, counterbalancing mechanism, material feeding means for applying a load to the counterbalancing mechanism, manipulative devices for variably setting the counterbalancing mechanism to counterbalance a predetermined load applied by the material feeding means, and means controlled by the manipulative devices for preventing operation of the material feeding means prior to the manipulative devices effecting a setting of the load responsive and counterbalancing mechanism away from a zero position.

4. In combination, load counterbalancing mechanism including a lever having a movable fulcrum, weight responsive means connected to said fulcrum to resist movement thereof, a receiver operatively connected to said mechanism to impose a load thereon and to simultaneously impose a load on said lever to move said fulcrum against resistance of the weight responsive means, means for feeding material to the receiver, a magnet for controlling operation of the material feeding means controlled by the position of the movable fulcrum to energize the magnet for causing the material feeding means to cut off the feeding to the receiver when the load applied to the counterbalancing mechanism is a predetermined amount, and means for retarding deenergization of said magnet when the load is removed from the counterbalancing mechanism, following the interruption in the feeding operation.

5. In combination, weighing mechanism, a material feeding means for applying a load to the weighing mechanism, a driving means for the material feeding means, means operable at will for stopping operation of the driving means, means controlled by the weighing mechanism for causing the material feeding means to apply a predetermined load to the mechanism, and means for rendering the stopping means ineffective until the predetermined load has been applied.

6. In combination, weighing mechanism, a load receiver operatively connected to the mechanism imposing a load thereon, recording means, a device capable of manual operation for taking a record from the recording means, a means automatically controlled by the weighing mechanism when a predetermined load in the receiver is acting on the mechanism for automatically operating the record-taking device, and means for preventing automatic operation of said device to permit the device to be manually operated for taking the record, and means controlled by the weighing mechanism for preventing manual operation of said device until said predetermined load is on the receiver.

7. In combination, weighing mechanism, a load receiver operatively connected to the mechanism for imposing a load thereon, material feeding means for feeding material to said receiver, an electric motor for operating the material feeding means, a circuit for said motor, recording means settable under control of the weighing mechanism to record a load of material in the receiver, means for taking a record from the recording means, and means controlled by the motor circuit for conditioning the record taking means to operate under subsequent control of the weighing mechanism.

8. In combination, weighing mechanism, means for applying a predetermined load in increments to said mechanism, means auxiliary to the mechanism, an electrical circuit for causing operation of the auxiliary means when the total predetermined load has been applied, a stop device operable at will for preventing operation of the circuit, and means controlled by the weighing mechanism for rendering the stop device ineffective to prevent operation of said circuit during the addition of fractions of said load to the mechanism and before said total predetermined load is fully applied.

9. In combination, weighing mechanism, means auxiliary to the weighing mechanism, an electric actuator for said auxiliary means, a circuit for said actuator, means controlled by the weighing mechanism and said circuit for determining operation of the auxiliary means by the actuator, a stop device, a latch for holding the stop device in actuated position, means for rendering the stop device effective while in latched actuated position to cause the circuit to open and operation of the actuator to stop, and a start device operated to re-close said circuit and while so operated releasing the latch to permit the stop device to return to ineffective stopping position.

10. In combination, weighing mechanism, means for applying a load to the mechanism, means auxiliary to the scale, an electrical circuit for causing operation of the auxiliary means when a predetermined load is acting on the weighing mechanism, a stop device operable at will for preventing operation of the circuit, and means controlled by the weighing mechanism for rendering the stop device ineffective to prevent operation of said circuit until after said predetermined load has been completely applied to the weighing mechanism.

11. In combination, weighing mechanism, means for applying a load to said mechanism, means auxiliary to the mechanism, an electric actuator for the auxiliary means, a circuit for controlling the actuator, current supply lines, a pair of paths for the circuit between the supply lines, a manual stop device for opening one of said paths while the remaining path is still closed, and means operative upon the completion of the weighing operation for opening the other path to thereby completely open said circuit.

12. In combination, weighing mechanism, a device auxiliary to the mechanism, controlling means for controlling operation of said auxiliary device, a plurality of disabling means, both of which must be operated for disabling the controlling means, one of said disabling means comprising a stop device separate from and independent of the weighing mechanism and the other being under control of the weighing mechanism.

13. The invention according to claim 12, said controlling means comprising an electrical circuit, and at least one of said means comprising a switch in the circuit ineffective to open the circuit until the other means is operated.

14. In combination, load counteracting mechanism, means for applying a load to said mechanism, a sensitive weight responsive and resisting device operatively connected to said mechanism to be moved to a neutral position when the applied load and the counteracting force of said mechanism are equal, recording means set under control of said mechanism according to the counteracting force exerted thereby, record-taking means for taking a record from the recording means, and means under control of the sensitive device and operative when the latter is at the neutral position for automatically operating the record-taking means.

15. In combinations, load counterbalancing mechanism adjusted to counterbalance a predetermined load, means for transmitting the force of the load to the counterbalancing mechanism, material feeding means to apply the load to the transmitting means for transmission to the counterbalance mechanism, a sensitive variable counterbalancing and equilibrium-seeking device for counterbalancing different magnitudes of forces, means connecting said device to aforesaid mechanism and to aforesaid transmitting means to respond to the difference between the counterbalancing force of said mechanism and the force transmitted thereto by the transmitting means, and control means operable by aforesaid device for stopping the material feeding by said material feeding means when the load applied to the transmitting means is either equal to said predetermined load or is less than aforesaid predetermined load within a certain tolerance weight.

16. In combination, load responsive and counterbalancing mechanism settable to counterbalance a predetermined hopper load, a hopper connected to said mechanism to apply the load to the mechanism and having a discharge valve, a sensitive variable weight counterbalancing device having a neutral equilibrium position and predetermined under and over positions to either side of its neutral position, means connecting the sensitive device to the counterbalancing mechanism and hopper for responding to the differences between the hopper load and the preset counterbalancing force of said mechanism, means for opening said discharge valve to discharge the hopper load when the load equals said predetermined hopper load, and means controlled by the sensitive device at either its predetermined under or over position for preventing operation of the valve opening means.

JAMES W. BRYCE.